(12) United States Patent
Fukasawa (10) Patent No.: US 8,848,224 B2
(45) Date of Patent: Sep. 30, 2014

(54) INFORMATION PROCESSING APPARATUS, INFORMATION PROCESSING METHOD, AND STORAGE MEDIUM

(75) Inventor: Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 13/468,143

(22) Filed: May 10, 2012

(65) Prior Publication Data

US 2012/0293833 A1 Nov. 22, 2012

(30) Foreign Application Priority Data

May 18, 2011 (JP) ................. 2011-111100

(51) Int. Cl.
*G06F 3/12* (2006.01)
*G06K 15/00* (2006.01)
(52) U.S. Cl.
CPC ............ *G06F 3/1203* (2013.01); *G06F 3/1225* (2013.01); *G06F 3/1286* (2013.01)
USPC .......................... 358/1.15; 358/1.16; 358/1.13
(58) Field of Classification Search
CPC .......... G06K 15/1817; G06K 15/1822; G06K 3/1273; G06K 3/1225
See application file for complete search history.

(56) References Cited

U.S. PATENT DOCUMENTS

| 8,020,170 | B2 | 9/2011 | Fukasawa | |
|---|---|---|---|---|
| 2008/0231891 | A1* | 9/2008 | Nakata | 358/1.15 |
| 2008/0291483 | A1 | 11/2008 | Shimatani | |
| 2008/0313360 | A1* | 12/2008 | Abe | 710/18 |
| 2009/0251728 | A1 | 10/2009 | Fukasawa | |
| 2010/0141988 | A1* | 6/2010 | Kai | 358/1.15 |
| 2010/0225946 | A1 | 9/2010 | Fukasawa | |
| 2011/0058219 | A1 | 3/2011 | Fukasawa | |

FOREIGN PATENT DOCUMENTS

| JP | 2006-079138 | 3/2006 |
|---|---|---|
| JP | 2006-344152 | 12/2006 |
| JP | 2007-080036 | 3/2007 |

* cited by examiner

*Primary Examiner* — Dov Popovici
(74) *Attorney, Agent, or Firm* — IPUSA, PLLC (57) ABSTRACT

An information processing apparatus includes a spooler, a request reception unit configured to receive a request related to print data from the spooler via a function interface, and at least one process execution unit configured to perform a process corresponding to the received request. The request reception unit is configured to cause the process execution unit to perform the process corresponding to the received request.

9 Claims, 12 Drawing Sheets

```
[                                                           ─51
    {
        "filter" = "drv1log.dll",  ─511
        "active" = true, ─513            ─512
        "exports" = [
            "StartDocPort",
            "EndDocPort",
            "WritePort",
            "ReadPort",
            "GetPrinterDataFromPort",
            "SendRecvBidiDataFromPort"
        ]
    },                                    ─52
    {
        "filter" = "drv1compress.dll",
        "active" = false, ─521
        "exports" = [
            "WritePort"
        ]
    },
]
```

INFORMATION PROCESSING APPARATUS, INFORMATION PROCESSING METHOD, AND STORAGE MEDIUM

CROSS-REFERENCE TO RELATED APPLICATION

The present application is based upon and claims the benefit of priority of Japanese Patent Application No. 2011-111100, filed on May 18, 2011, the entire contents of which are incorporated herein by reference.

BACKGROUND OF THE INVENTION

1. Field of the Invention

An aspect of this disclosure relates to an image processing apparatus, an image processing method, and a storage medium.

2. Description of the Related Art

A program module called a language monitor is used in a printing system of Windows (registered trademark). The language monitor is positioned between a spooler for spooling print data and a port monitor for transmitting the print data to a printer (see, for example, Japanese Laid-Open Patent Publication No. 2007-080036). Accordingly, the print data spooled by the spooler are input to the language monitor. The language monitor processes the input print data and outputs the processed print data to the port monitor.

Printer manufacturers, for example, can freely design language monitors. In other words, a language monitor can be uniquely designed to perform various processes such as print data processing, log recording, and bidirectional communications with a printer before print data spooled by the spooler are transmitted by the port monitor. Accordingly, it is possible to relatively easily expand the capability of a printing system by installing a language monitor with additional functions.

Here, a language monitor is implemented as a dynamic link library (DLL) that is loaded when a process of the spooler is started and unloaded when the process of the spooler is terminated. Accordingly, unless the process of the spooler is terminated, the language monitor continues to be loaded from when an operating system (OS) is started to when the OS is shut down. Therefore, when a new language monitor with additional functions is installed, it is necessary to restart the process of the spooler after the installation to enable the functions of the language monitor.

However, when the spooler is restarted, print data spooled in the spooler may be discarded. Particularly, when a spooler of a print server for processing print data of plural client PCs is restarted and the print data in the spooler are discarded, it may affect a large number of users. This problem may cause customers to refrain from introducing a printer driver using a language monitor (i.e., a printer that uses such a printer driver).

SUMMARY OF THE INVENTION

In an aspect of this disclosure, there is provided an information processing apparatus that includes a spooler, a request reception unit configured to receive a request related to print data from the spooler via a function interface, and at least one process execution unit configured to perform a process corresponding to the received request. The request reception unit is configured to cause the process execution unit to perform the process corresponding to the received request.

DESCRIPTION OF THE PREFERRED EMBODIMENTS

Figure 1:
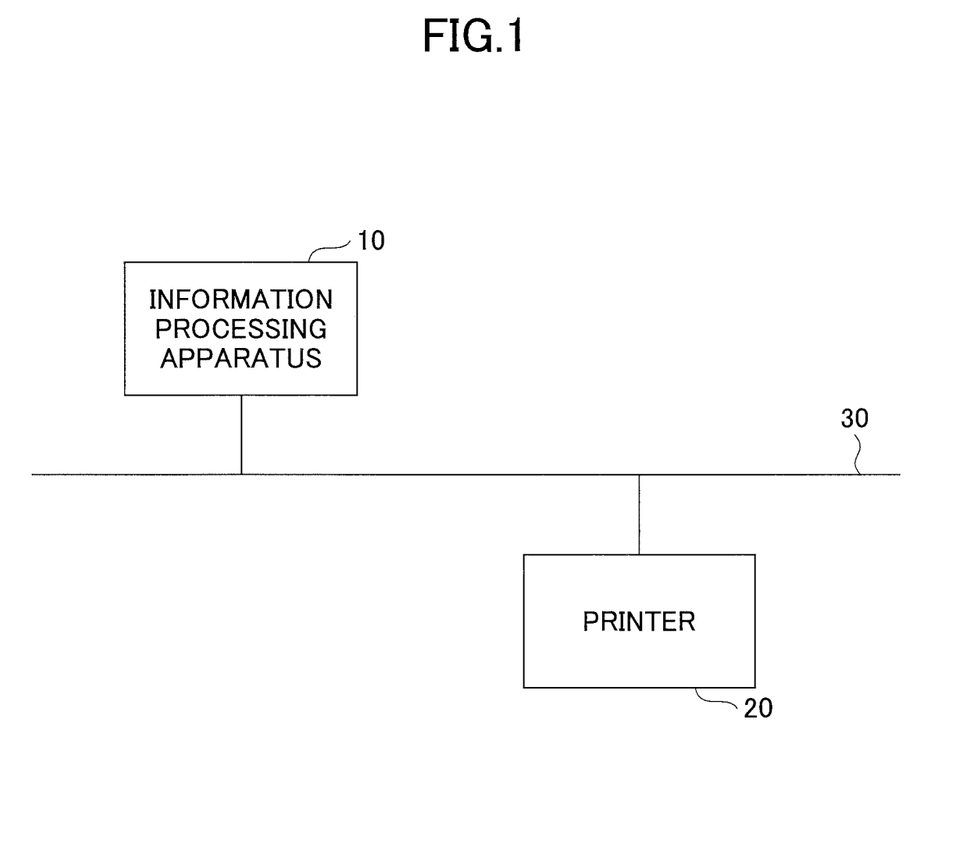
FIG. 1 is a drawing illustrating an exemplary configuration of a printing system according to a first embodiment.

Preferred embodiments of the present invention are described below with reference to the accompanying drawings. FIG. 1 is a drawing illustrating an exemplary configuration of a printing system according to a first embodiment. The printing system of FIG. 1 includes at least one information processing apparatus 10 and at least one printer 20 that are connected to each other for communications via a (wired or wireless) network 30 such as a local area network (LAN).

The printer 20 performs printing according to print data sent from the information processing apparatus 10. The printer 20 may include functions in addition to a print function. For example, printer 20 may be implemented by a multifunction peripheral.

The information processing apparatus 10 may be implemented by a computer and sends print data (or a print request) to the printer 20. The information processing apparatus 10 may be a personal computer (PC) that is provided for each user and operated directly by the user, or may be a computer that functions as a print server. In the present embodiment, it is assumed that the information processing apparatus 10 is a PC that is operated directly by the user.

Figure 2:
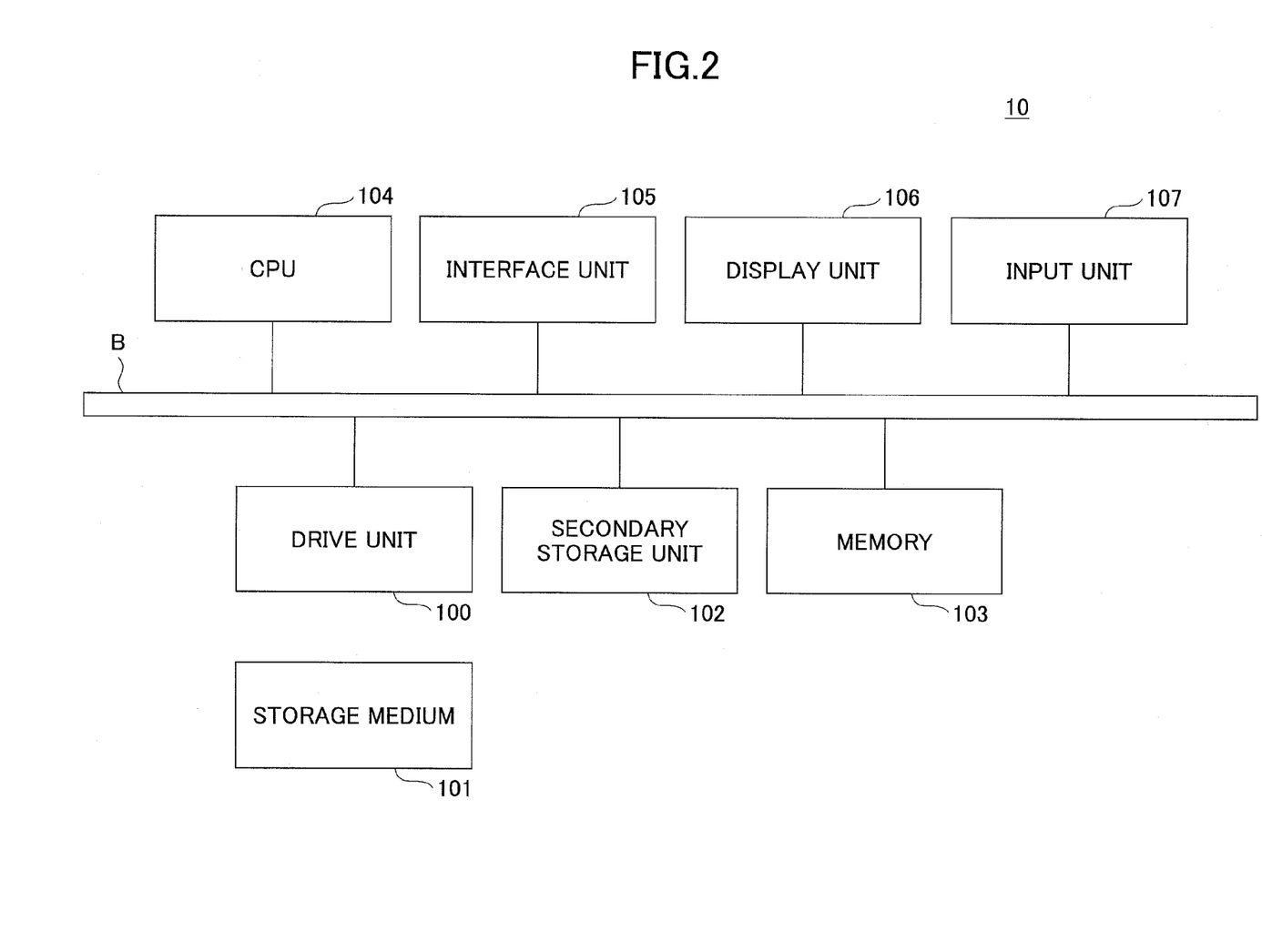
FIG. 2 is a block diagram illustrating an exemplary hardware configuration of an information processing apparatus according to the first embodiment.

FIG. 2 is a block diagram illustrating an exemplary hardware configuration of the information processing apparatus 10 according to the first embodiment. As illustrated in FIG. 2, the information processing apparatus 10 may include a drive unit 100, a secondary storage unit 102, a memory 103, a CPU 104, an interface unit 105, a display unit 106, and an input unit 107 that are connected to each other via a bus B.

Programs for executing various processes at the information processing apparatus 10 may be provided via a storage medium 101 such as a CD-ROM, a DVD-ROM, or a USB memory. When the storage medium 101 storing programs is mounted on the drive unit 100, the programs are read by the drive unit 100 from the storage medium 101 and are installed in the secondary storage unit 102. The programs may not necessarily be installed from the storage medium 101. Alternatively, the programs may be downloaded via a network from another computer. The secondary storage unit 102 stores the installed programs and other necessary files and data.

The memory 103 temporarily stores programs read from the secondary storage unit 102 when the programs are executed. The CPU 104 implements functions of the information processing apparatus 10 according the programs temporarily stored in the memory 103. The interface unit 105 connects the information processing apparatus 10 to a network. The display unit 106 displays, for example, graphical user interfaces (GUI) output by the programs. The input unit 107 includes, for example, a keyboard and a mouse for receiving user inputs.

Figure 3:
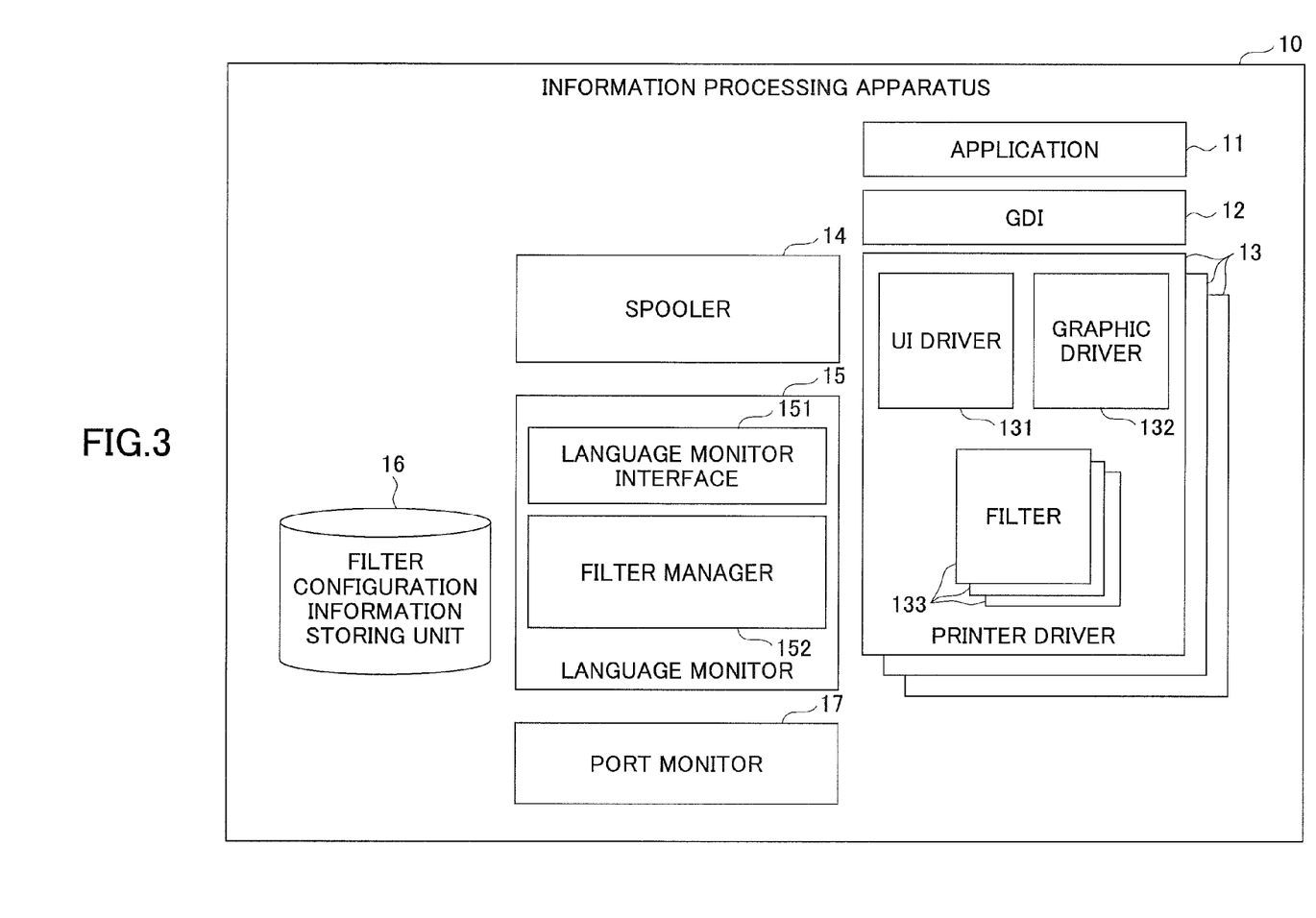
FIG. 3 is a block diagram illustrating an exemplary software configuration of an information processing apparatus according to the first embodiment.

FIG. 3 is a drawing illustrating an exemplary software configuration of the information processing apparatus 10 according to the first embodiment. As illustrated in FIG. 3, the information processing apparatus 10 may include an application 11, a graphical device interface (GDI) 12, one or more printer drivers 13 (may be referred to in the singular form for descriptive purposes), a spooler 14, a language monitor 15, a filter configuration information storing unit 16, and a port monitor 17. The application 11, the printer drivers 13, the spooler 14, the language monitor 15, and the port monitor 17 cause the CPU 104 to execute processes to implement their functions.

The application 11 is, for example, a program that generates document data to be printed in response to operations performed by the user via an interactive interface. The GDI 12 is a collection of graphic functions provided by an operating system (OS) (not shown) such as Windows (registered trademark). The application 11 sends a print request via the GDI 12 to the printer driver 13 in response to a print instruction. For example, the GDI 12 inputs, to the printer driver 13, a command corresponding to the print request from the application 11 via an interface called a device driver interface (DDI) of the printer driver 13.

The printer driver 13 may include a user interface (UI) driver 131 and a graphic driver 132. The components of the printer driver 13 may be implemented, for example, as separate program modules (e.g., dynamic link libraries (DLL)).

The UI driver 131 displays screens that allow the user to specify print settings (print conditions or print properties).

The graphic driver 132 generates print data (RAW data) according a command input via the DDI and print settings specified via the UI driver 131. The print data generated by the graphic driver 132 are input to the spooler 14.

The printer driver 13 may also include one or more filters 133. Each filter 133 is a program module such as a DLL that can be dynamically loaded, unloaded, and linked. The filters 133 implement processes that the language monitor 15 is requested to perform. In other words, processes that the language monitor 15 is requested to perform are actually implemented by the filters 133. More specifically, each filter 133 includes one or more function interfaces (or application program interfaces (API)) that serve as function interfaces of the language monitor 15.

The spooler 14 is a program that is executed as a process. The spooler 14 temporarily stores print data generated by the graphic driver 132 in the secondary storage unit 102, and then inputs the print data to the language monitor 15.

The language monitor 15 is a DLL used by the spooler 14 and is loaded when the spooler 14 is started. The language monitor 15 may include a language monitor interface 151 and a filter manager 152. The language monitor interface 151 includes one or more function interfaces for the language monitor 15 and receives requests from the spooler 14 via the function interfaces. The language monitor interface 151 does not perform processes corresponding to the requests by itself. Instead, the language monitor interface 151 assigns (requests or causes) the filters 133 to perform the processes.

The filter manager 152 refers to the filter configuration information storing unit 16 to determine one of the filters 133 to be assigned to perform the process requested by the spooler 14. Also, the filter manager 152 loads and unloads the determined filter 133 to and from the memory 103.

The filter configuration information storing unit 16 stores information (hereafter referred to as "filter configuration information") indicating the correspondence between the function names of function interfaces and the filters 133 where the function interfaces are implemented. The filter configuration information storing unit 16 may be implemented, for example, by a storage area of the secondary storage unit 102. For example, the filter configuration information may be recorded in the registry of Windows (registered trademark), which is used to store various settings.

The port monitor 17 sends print data processed by the language monitor 15 (in practice, by the filters 133) to the printer 20.

Figure 4:
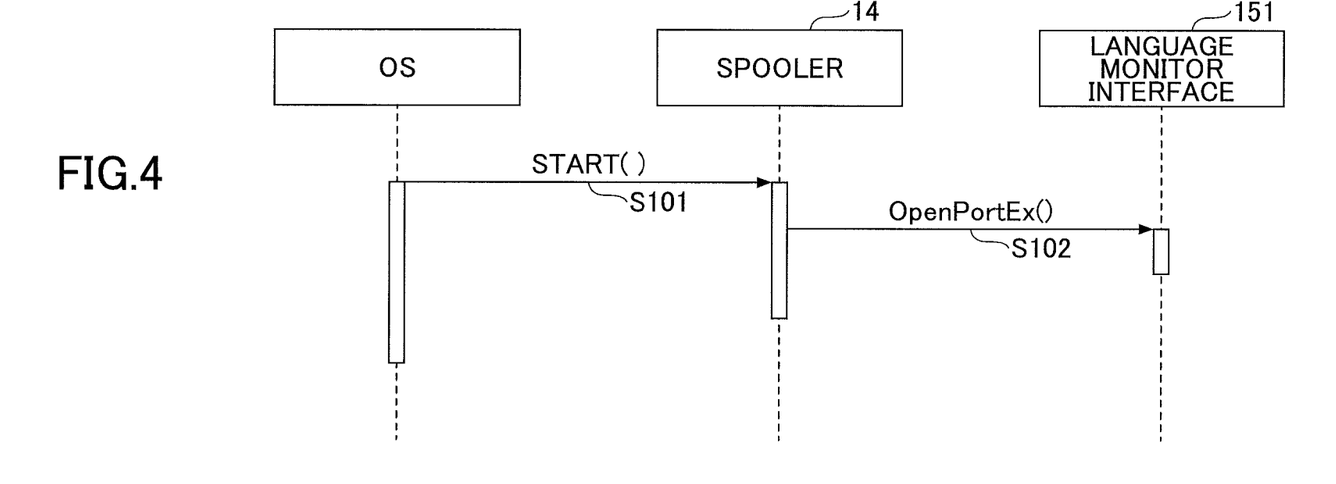
FIG. 4 is a sequence chart illustrating an exemplary process performed at start-up of an information processing apparatus.

An exemplary process performed by the information processing apparatus 10 is described below. FIG. 4 is a sequence chart illustrating an exemplary process performed at start-up of the information processing apparatus 10.

In step S101, the spooler 14 is started by the OS as a process. Then, in step S102, the spooler 14 calls a function OpenPortEx( ) of the language monitor interface 151. OpenPortEx( ) is a function that is called when the spooler 14 is started. For each logical printer defined in the information processing apparatus 10, the spooler 14 calls OpenPortEx( ) with the logical printer name of the logical printer specified as the argument. Here, it is assumed that the language monitor 15 is loaded and becomes available (i.e., becomes ready to be called) when the spooler 14 is started.

The spooler 14 may also call OpenPortEx( ) of the language monitor interface 151 on occasions other than the start-up of the information processing apparatus. For example, the spooler 14 may call OpenPortEx( ) when a logical printer is newly added. In this case, the spooler 14 specifies the logical printer name of the newly-added logical printer as the argument of OpenPortEx( ).

Figure 5:
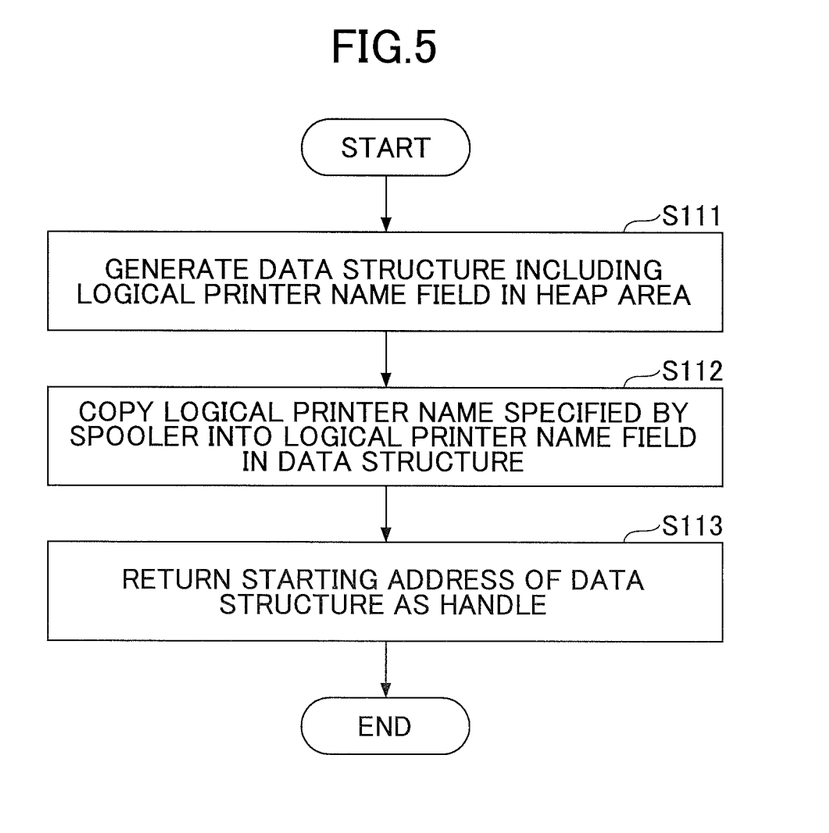
FIG. 5 is a flowchart illustrating an exemplary process performed by a language monitor interface when OpenPortEx( ) is called.

Next, an exemplary process performed by the language monitor interface 151 when OpenPortEx( ) is called (i.e., a process implemented in the language monitor interface 151 for OpenPortEx( )) is described.

FIG. 5 is a flowchart illustrating an exemplary process performed by the language monitor interface 151 when OpenPortEx( ) is called.

In step S111, the language monitor interface 151 generates a data structure including a field (or a member variable) for storing a logical printer name in the memory 103 (heap area). In step S112, the language monitor interface 151 copies a logical printer name specified as the argument of OpenPortEx( ) into the member variable of the data structure. In step S113, the language monitor interface 151 returns the starting address of the data structure as a handle (or an identifier) to the spooler 14. Thereafter, the spooler 14 specifies the handle as the identifier of the logical printer when calling a function of the language monitor interface 151.

Next, an exemplary process performed by the language monitor 15 when a function interface is called by the spooler 14 after the initialization processes of FIGS. 4 and 5 is described.

Figure 6:
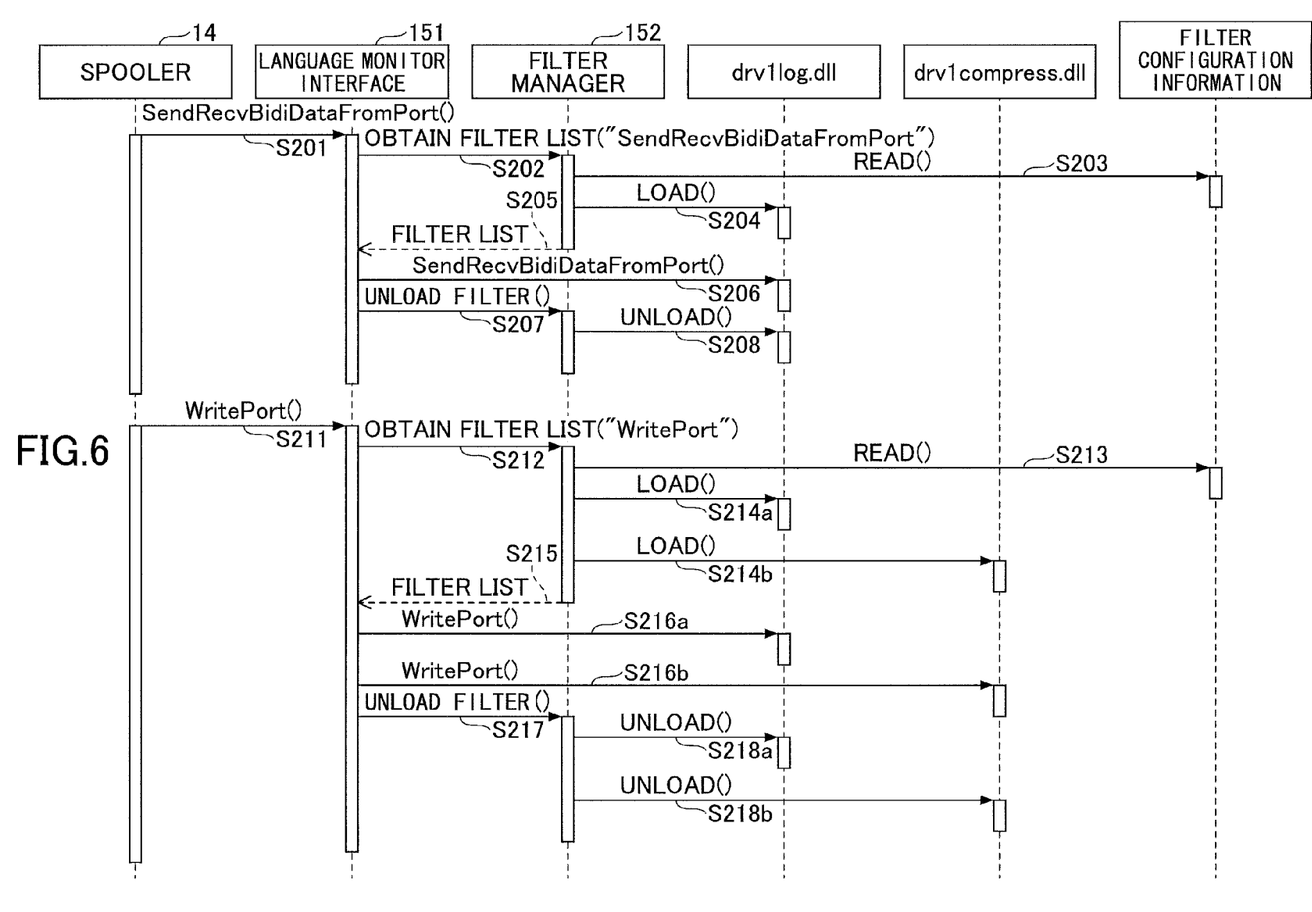
FIG. 6 is a sequence chart illustrating an exemplary process according to the first embodiment which is performed by a language monitor in response to a function call from a spooler.

FIG. 6 is a sequence chart illustrating an exemplary process according to the first embodiment which is performed by the language monitor 15 in response to a function call from the spooler 14.

In step S201, the spooler 14 calls a function (in this example, SendRecvBidiDataFromPort( )) of the language monitor interface 151. Here, it is assumed that the handle returned to the spooler 14 in step S113 of FIG. 5 is specified as the argument of the function. A handle is returned for each logical printer. Accordingly, the spooler 14 specifies, as the argument, a handle corresponding to a logical printer related to a print job.

In step S202, the language monitor interface 151 sends a filter list request, where a character string indicating the function name ("SendRecvBidiDataFromPort") of the called function is specified, to the filter manager 152, and thereby requests the filter manager 152 to obtain a filter list. Here, "filter list" indicates a list of addresses of functions of the filters 133.

In the filter list request, the argument specified by the spooler 14 is specified without change. Also, the corresponding logical printer name is specified as an argument of the filter list request. More specifically, the language monitor interface 151 obtains a logical printer name from a data structure corresponding to the handle specified in step S201 and specifies the obtained logical printer name in the filter list request. Here, "data structure corresponding to a handle" indicates a data structure whose starting address is indicated by the handle.

In response to the filter list request, in step S203, the filter manager 152 reads filter configuration information from the filter configuration information storing unit 16, and determines one of the filters 133 that includes the called function.

Figure 7:
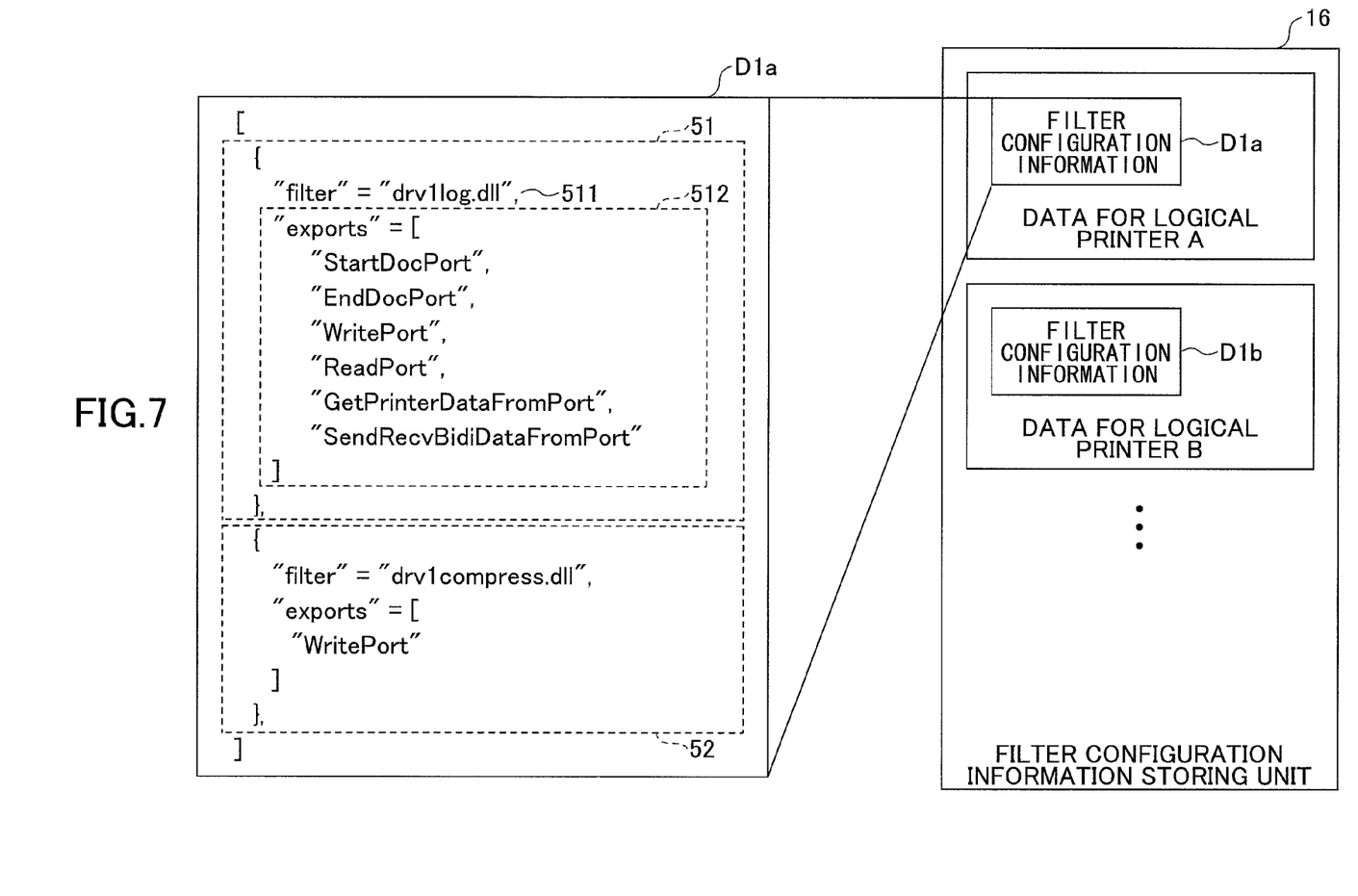
FIG. 7 is a drawing illustrating an exemplary configuration of a filter configuration information storing unit and exemplary filter configuration information according to the first embodiment.

FIG. 7 is a drawing illustrating an exemplary configuration of the filter configuration information storing unit 16 and exemplary filter configuration information. As illustrated in FIG. 7, sets of filter configuration information are managed for respective logical printers. In other words, sets of filter configuration information are associated with logical printer names. For example, filter configuration information may be recorded in a registry as data of a PrinterDriverData key under a registry key generated for each logical printer. The filter configuration information may be recorded by, for example, the UI driver 131 when a logical printer is generated.

In FIG. 7, filter configuration information D1a is stored for a logical printer A. In the example of FIG. 7, the filter configuration information D1a is written according to JavaScript Object Notation (JSON). However, filter configuration information may also be written in any other format such as eXtensible Markup Language (XML).

The filter configuration information D1a includes definitions 51 and 52 for the filters 133 corresponding to the logical printer A. That is, the filter configuration information D1a includes definitions for two filters 133. The number of definitions varies depending on the number of the filters 133 corresponding to the logical printer A.

In a description 511 of the definition 51, the character string "drv1log.dll" following "'filter"=' indicates the path name of a filter 133 corresponding to the definition 51. In the present embodiment, the path name is represented by a relative path from a folder where the printer driver 13 is.

In a description 512 of the definition 51, character strings placed in brackets [ ] following "'exports"=' indicate function names of functions that are implemented in the filter 133 and exported (those functions are hereafter referred to as "exported functions"). Here, "exported" indicates that the functions can be called from the outside of the DLL.

The definition 52 is also written in a similar manner and includes the path name of a filter 133 and a function name of a function implemented in the filter 133.

In the descriptions below, it is assumed that the logical printer name of the logical printer A is specified in the filter list request in step S202 of FIG. 6. In this case, the filter manager 152, in step S203, identifies the path name of a filter 133 where "SendRecvBidiDataFromPort" is implemented by referring to the definitions 51 and 52 of the filter configuration information D1a. In the example of FIG. 7, the definition 51 includes "SendRecvBidiDataFromPort". Accordingly, the filter manager 152 identifies the path name of "drv1log.dll".

In step S204, the filter manager 152 loads the identified filter 133 (drv1log.dll) and obtains the address of the called function "SendRecvBidiDataFromPort" in the loaded filter 133. In step S205, the filter manager 152 returns a filter list including the obtained address to the language monitor interface 152. In this example, since the called function is implemented in only one filter 133, the filter list includes only one address.

In step S206, the language monitor interface 151 calls the function "SendRecvBidiDataFromPort" based on the address in the returned filter list. As a result, the function "SendRecvBidiDataFromPort" in drv1log.dll is called. In other words, drv1log.dll is assigned to perform the process of the function "SendRecvBidiDataFromPort". In response, drv1log.dll executes the process defined by the function "SendRecvBidiDataFromPort".

In step S207, the language monitor interface 151 requests the filter manager 152 to unload the filter 133. In step S208, in response to the request, the filter manager 152 unloads (or releases) the filter 133 (drv1log.dll) loaded in step S204.

For example, Windows (registered trademark) APIs may be used to dynamically load and unload a DLL and to obtain the address of a function in a DLL.

Step S211 and the subsequent steps represent a process performed when the spooler 14 calls a function WritePort( ) of the language monitor interface 151. Also in this process, the handle returned to the spooler 14 in step S113 of FIG. 5 is specified as the argument of the function.

In step S212, the language monitor interface 151 sends a filter list request, where a character string indicating the function name ("WritePort") of the called function is specified, the filter manager 152 and thereby requests the filter manager 152 to obtain a filter list. In the filter list request, the argument specified by the spooler 14 is specified without change. Also, the logical printer name corresponding to the handle is specified as an argument of the filter list request.

In step S213, the filter manager 152 reads the filter configuration information D1a corresponding to the specified logical printer name from the filter configuration information storing unit 16, and determines one of the filters 133 that includes the called function. In the filter configuration information D1a (see FIG. 7), "WritePort" is implemented in two filters 133, i.e., "drv1log.dll" and "drv1compress.dll". Therefore, in steps S214a and S214b, the filter manager 152 loads "drv1log.dll" and "drv1compress.dll", and obtains the addresses of the called function "WritePort" in the loaded filters 133. Accordingly, in this case, two addresses are obtained.

In step S215, the filter manager 152 returns a filter list including the obtained addresses to the language monitor interface 151. The filter list is formatted such that the order of the definitions in the filter configuration information D1a can be identified. For example, in the filter list, the address of "WritePort" in "drv1log.dll" is placed before the address of "WritePort" in "drv1compress.dll".

In steps S216a and S216b, the language monitor interface 151 calls the function "WritePort" based on the addresses in the order they are arranged in the returned filter list. Accordingly, the function "WritePort" in drv1log.dll is called first, and then the function "WritePort" in drv1compress.dll is called.

Thus, when the same function is implemented in plural filters 133, multiple instances of the function in the filters 133 are called in the order the filters 133 are defined in the filter configuration information. This is because the result of a process may change depending on the order instances of the function are called. In other words, definitions of the filters 133 are written in the filter configuration information in an order to achieve desired results.

Here, a process performed by a function in a filter 133 may differ from a process performed by the same function in another filter 133. For example, the function "WritePort" in drv1log.dll implements a process for logging the call of "WritePort", and the function "WritePort" in drv1compress.dll implements a process for compressing print data. This is the reason why multiple instances of the same function in different filters 133 are called.

In step S217, the language monitor interface 151 requests the filter manager 152 to unload the filters 133. In steps S218a and S218b, in response to the request, the filter manager 152 unloads (or releases) the filters 133 (drv1log.dll and drv1compress.dll) loaded in steps S214a and S214b.

Next, details of a process performed by the filter manager 152 in response to the filter list request received in step S202 or S212.

Figure 8:
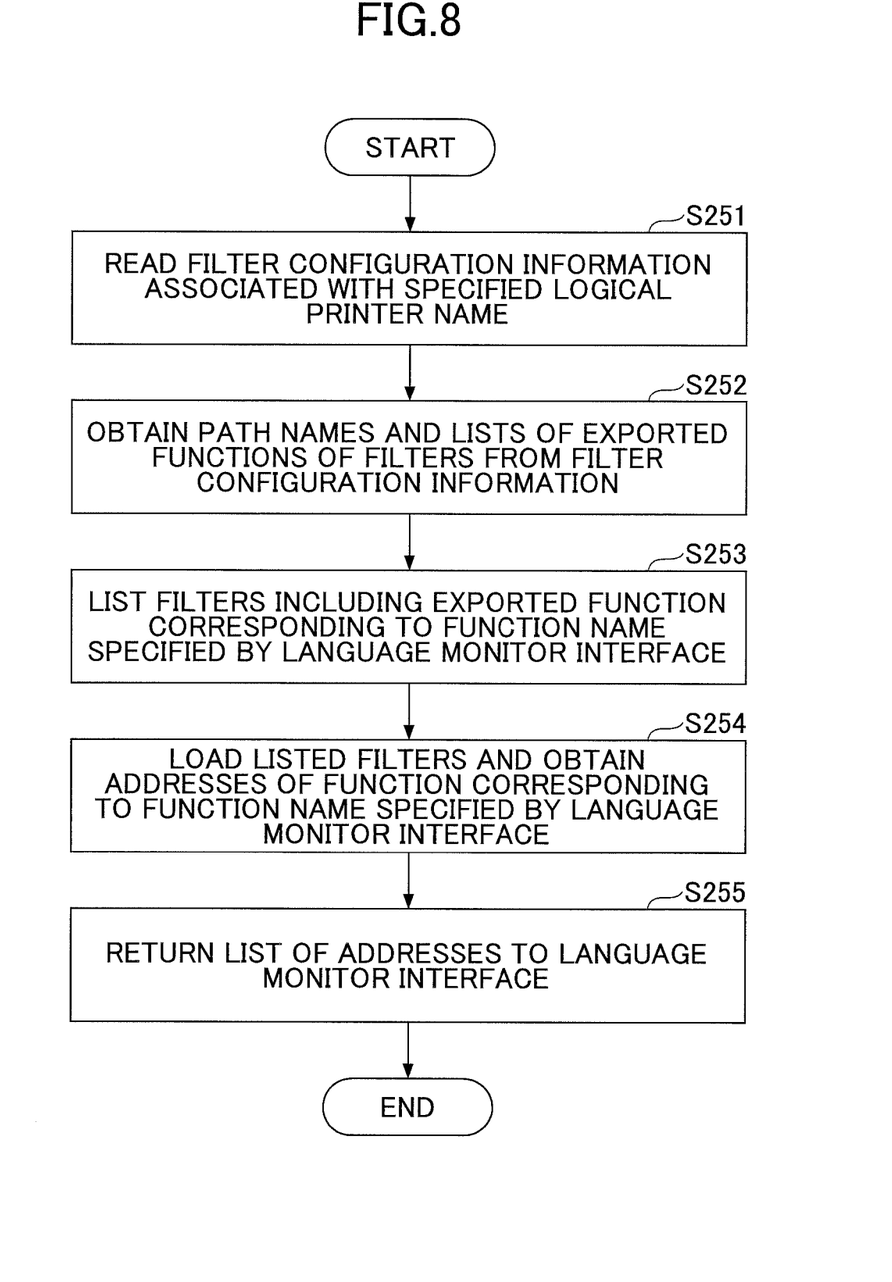
FIG. 8 is a flowchart illustrating an exemplary process according to the first embodiment which is performed by a filter manager in response to a filter list request.

FIG. 8 is a flowchart illustrating an exemplary process according to the first embodiment which is performed by the filter manager 152 in response to a filter list request.

In step S251, the filter manager 152 reads filter configuration information associated with a logical printer name specified in the filter list request. For example, assuming that a registry is used as the filter configuration information storing unit 16, the filter manager 152 calls OpenPrinter( ) with the logical printer name specified as an argument and thereby obtains the handle of the corresponding logical printer. Then, the filter manager 152 calls GetPrinterData( ), where the handle and the name of a key in the registry corresponding to the filter configuration information are specified, and thereby obtains the filter configuration information of the logical printer.

In step S252, the filter manager 152 parses (or analyzes) the read filter configuration information, and thereby obtains the path names and lists of exported function names of the respective filters 133. In step S253, based on the information obtained in step S252, the filter manager 152 extracts (or lists) the path names of filters 133 that include an exported function name corresponding to the function name of a called function (i.e., a function name specified in the filter list request).

In step S254, the filter manager 152 loads the filters 133 corresponding to the extracted path names, and obtains the addresses of the called function in the loaded filters 133.

In step S255, the filter manager 152 returns a filter list including the obtained addresses to the language monitor interface 152. In the filter list, the addresses are arranged in the order that the definitions of the corresponding filters 133 are arranged in the filter configuration information.

As described above, according to the first embodiment, the language monitor 15 loaded by the spooler 14 does not perform a process corresponding to a called function interface. Instead, the process is performed by a filter 133 that is loaded and unloaded by the language monitor 15. This configuration makes it possible to change and/or add functions of the language monitor 15 by replacing and/or adding the filters 133. The filters 133 are dynamically loaded and unloaded each time when the language monitor 15 receives a function call from the spooler 14. Accordingly, this configuration makes it possible to enable a replaced or added filter 133 without restarting the spooler 14.

Also in the first embodiment, a filter 133 to be assigned to perform a process is identified based on filter configuration information. This configuration makes it possible to easily change filters 133 to be assigned to perform a process by editing the filter configuration information.

Further, the first embodiment makes it possible to associate multiple filters 133 with the same function. In other words, according to the first embodiment, it is possible to perform a process corresponding to the same function by multiple filters 133. This configuration makes it possible to efficiently perform various processes by combining filters 133 skillfully designed as components.

Next, a second embodiment is described. Here, differences between the first embodiment and the second embodiment are mainly described. Therefore, descriptions in the first embodiment may also be applied to the second embodiment unless otherwise mentioned.

Figure 9:
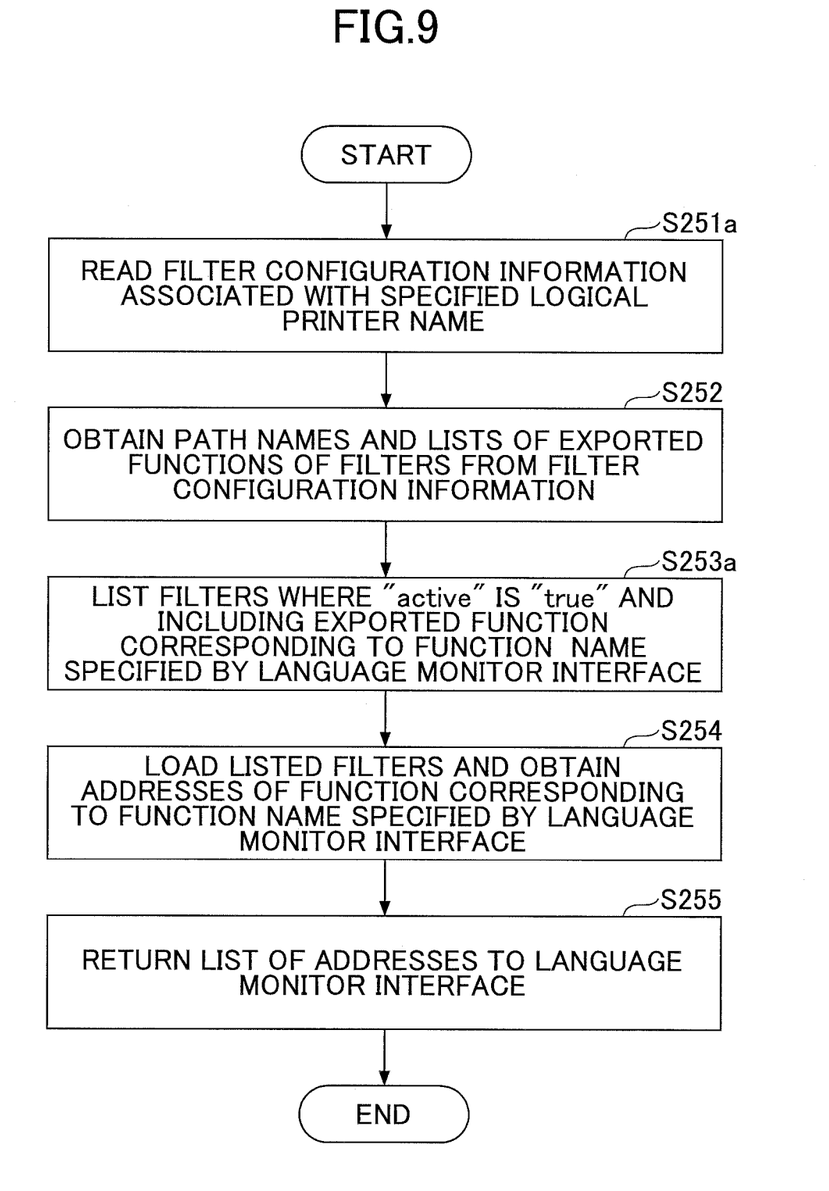
FIG. 9 is a flowchart illustrating an exemplary process according to a second embodiment which is performed by a filter manager in response to a filter list request.

FIG. 9 is a flowchart illustrating an exemplary process according to the second embodiment which is performed by the filter manager 152 in response to a filter list request. The same reference numbers as in FIG. 8 are assigned to the corresponding steps in FIG. 9 and detailed descriptions of those steps are omitted.

In FIG. 9, step S251 of FIG. 8 is replaced with step S251a. This is because the format of filter configuration information of the second embodiment is partly different from that of the first embodiment.

Figure 10:
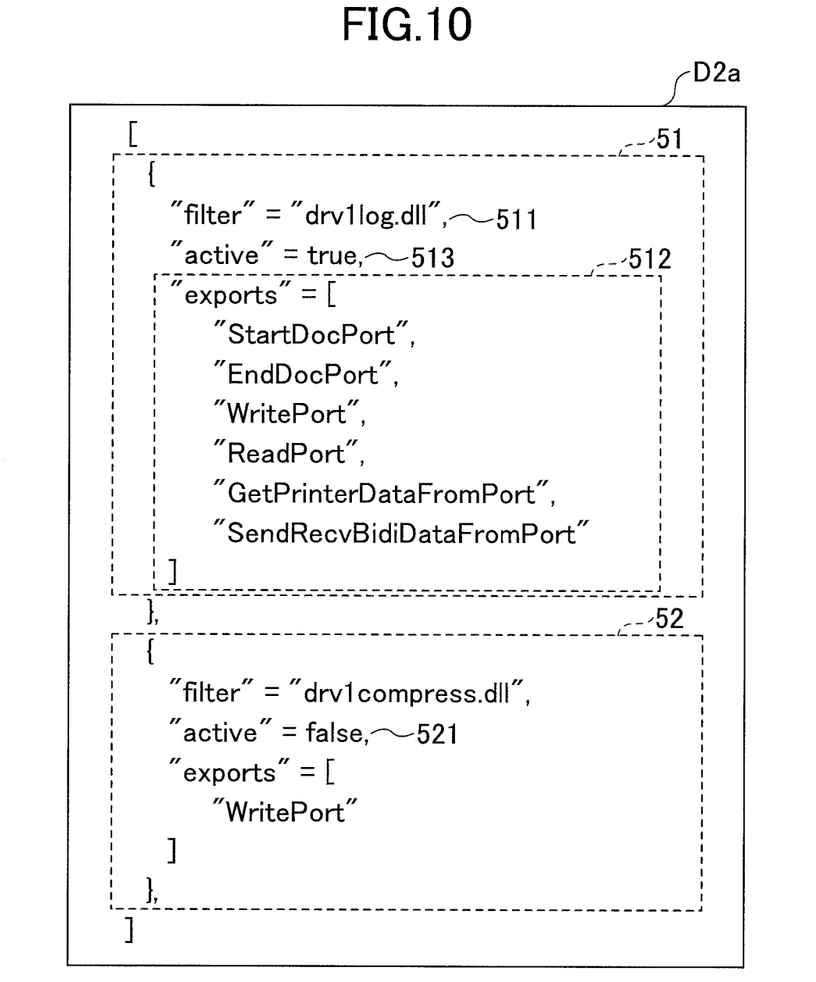
FIG. 10 is a drawing illustrating exemplary filter configuration information according to the second embodiment.

FIG. 10 is a drawing illustrating exemplary filter configuration information according to the second embodiment. The same reference numbers as in FIG. 7 are assigned to the corresponding parts in FIG. 10 and descriptions of those parts are omitted here.

Filter configuration information D2a of FIG. 10 additionally includes, for each filter 133, a description that starts with "'active'=". That is, a description 513 is added to the definition 51 and a description 521 is added to the definition 52.

When "true" is specified after "'active'=", it indicates that the filter 133 is valid. Meanwhile, when "false" is specified after "'active'=", it indicates that the filter 133 is invalid. Thus, the description 513/521 is an example of information indicating validity of the filter 133. In the filter configuration information D2a, "drv1log.dll" is valid and "drv1compress.dll" is invalid. Here, it is assumed that a valid filter 133 is to be used and an invalid filter 133 is not to be used.

In step S253a, the filter manager 152 extracts (or lists) filters 133 that are valid and include an exported function name corresponding to the function name of a called function (i.e., a function name specified in the filter list request).

Steps S254 and S255 are substantially the same as those described in the first embodiment.

Figure 11:
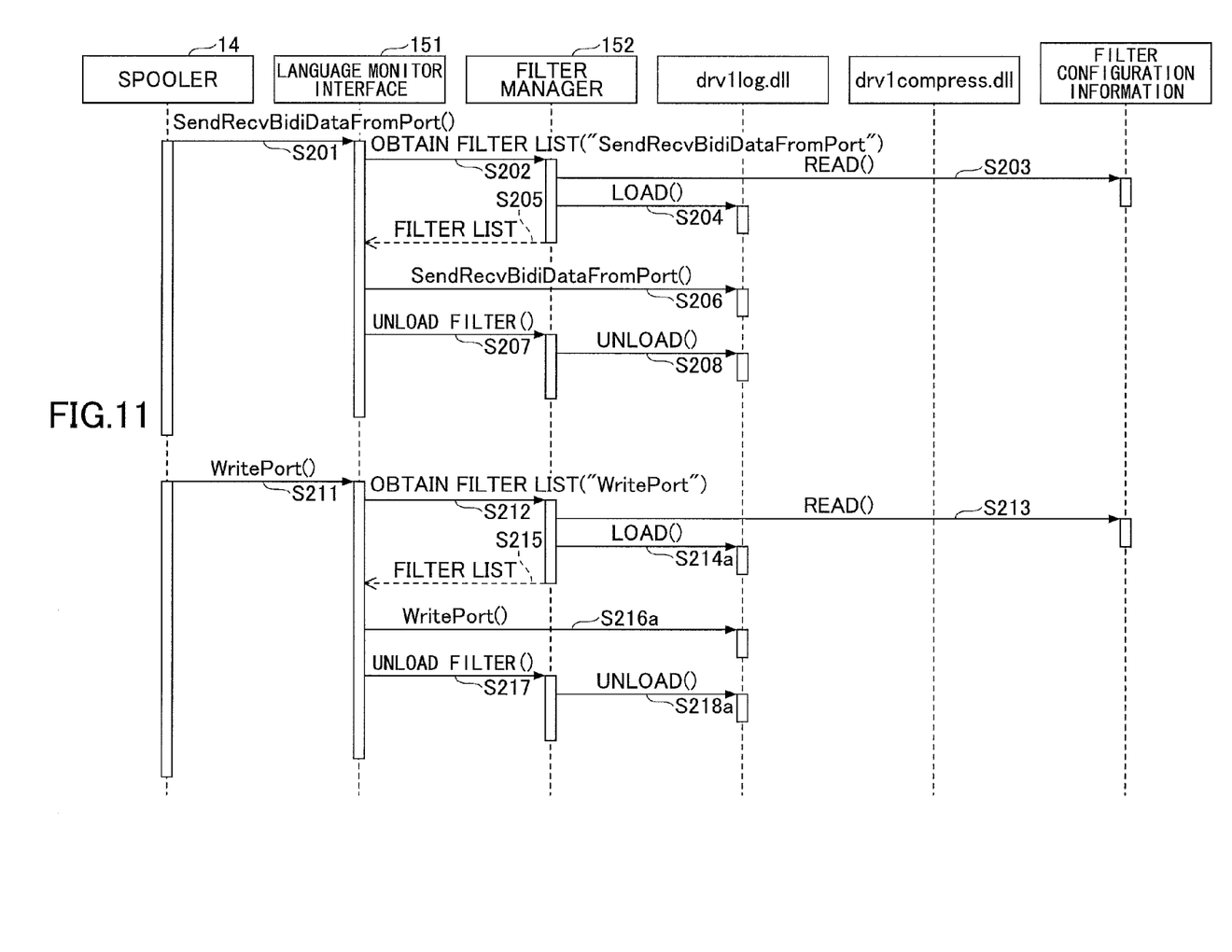
FIG. 11 is a sequence chart illustrating an exemplary process according to the second embodiment which is performed by a language monitor in response to a function call from a spooler.

In the second embodiment, due to the above described change in the process performed by the filter manger 152, the process of FIG. 6 in the first embodiment changes as illustrated in FIG. 11.

FIG. 11 is a sequence chart illustrating an exemplary process according to the second embodiment which is performed by the language monitor 15 in response to a function call from the spooler 14. The same reference numbers as in FIG. 6 are assigned to the corresponding steps in FIG. 11 and detailed descriptions of those steps are omitted.

In FIG. 11, a process (steps S201 through S208) performed when the function "SendRecvBidiDataFromPort" is called by the spooler is substantially the same as that in the first embodiment. This is because the function "SendRecvBidiDataFromPort" is implemented only in drv1log.dll that is a valid filter 133 in the second embodiment.

Meanwhile, when the function "WritePort" is called by the spooler 14, steps S214*b*, S216*b*, and S218*b* in FIG. 6, which are related to drv1compress.dll, are not performed in the second embodiment. This is because drv1compress.dll is an invalid filter 133 in the second embodiment and the address of "WritePort" in drv1compress.dll is not included in the filter list.

The validity of the filters 133 may be set, for example, via a screen displayed by the UI driver 131.

Figure 12:
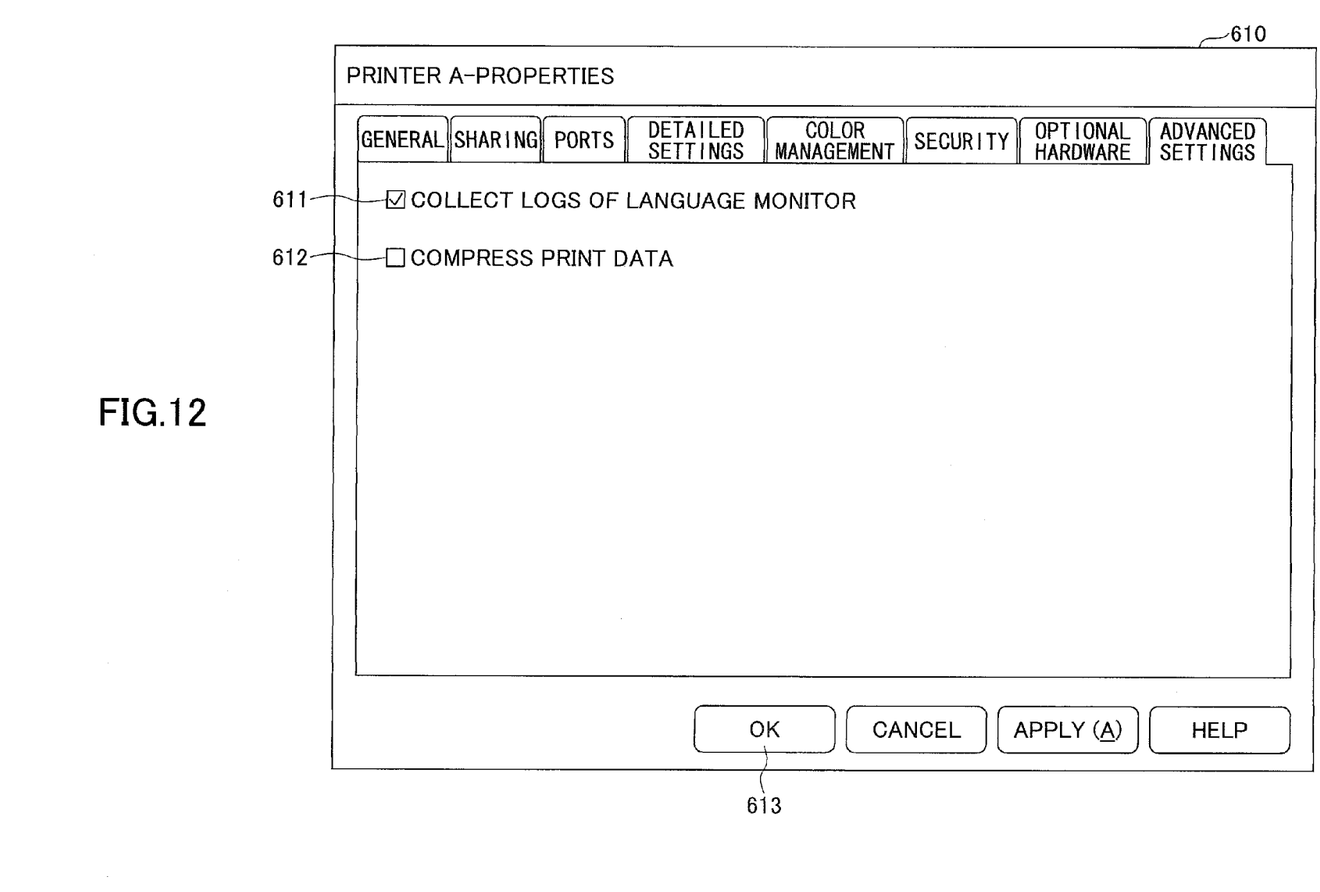
FIG. 12 is a drawing illustrating an exemplary screen for setting the validity of filters.

FIG. 12 is a drawing illustrating an exemplary screen 610 for setting the validity of the filters 133. The screen 610 is a property screen for the logical printer A which is displayed by the UI driver 131. In FIG. 12, one of the tabs of the screen 610 is selected.

The screen 610 includes check boxes 611 and 612. The check box 611 is used to set the validity of "drv1log.dll". The check box 612 is used to set the validity of "drv1compress.dll".

When the statuses (i.e., checked or unchecked) of the check boxes 611 and 612 are updated and an OK button 613 is pressed, the UI driver 131 writes values (true or false) corresponding to the statuses of the check boxes 611 and 612 in the filter configuration information D2*a* of the logical printer A. More specifically, a value corresponding to the status of the check box 611 is written in the description 513, and a value corresponding to the status of the check box 612 is written in the description 521 (see FIG. 10).

A caption "COLLECT LOGS OF LANGUAGE MONITOR" is attached to the check box 611, and a caption "COMPRESS PRINT DATA" is attached to the check box 612. These captions are attached for the convenience of the user. Meanwhile, if a character string "drv1log.dll" is attached to the check box 611 and a character string "drv1compress.dll" is attached to the check box 612, it is difficult for the user to determine what kinds of functions become valid when the check boxes 611 and 612 are checked. Therefore, in FIG. 12, captions indicating the functions of the corresponding filters 133 are attached to the check boxes 611 and 612.

As described above, the second embodiment makes it possible to easily change the validity of the filters 133 by editing the filter configuration information. This in turn makes it possible to easily customize a process performed by the language monitor 15.

In the above embodiments, the language monitor 15 is an example of a request reception unit, the filter 133 is an example of a process execution unit, and the filter configuration information storing unit 16 is an example of a storing unit.

An aspect of this disclosure provides an information processing apparatus, an information processing method, and a storage medium storing a program that make it possible to enable newly-added or updated functions of a language monitor without restarting a spooler.

The present invention is not limited to the specifically disclosed embodiments, and variations and modifications may be made without departing from the scope of the present invention.

What is claimed is:

1. An information processing apparatus, comprising:
   a spooler;
   at least one process execution unit configured to perform a process corresponding to a name of a function,
   a storing unit that stores configuration information that associates the process execution unit with the name of the function; and
   a request reception unit configured to receive a request related to print data from the spooler via a predetermined function interface and identify the process execution unit for performing the process based on the name of the function of the predetermined function interface for the request and the configuration information, and cause the identified process execution unit to perform the process corresponding to the name of the function.

2. The information processing apparatus as claimed in claim 1, wherein the storing unit stores the configuration information for each of a plurality of logical printers,
   wherein the at least one process execution unit comprises a plurality of process execution units; and
   the request reception unit is configured to receive a name of a logical printer from the spooler, identify one of process execution units that executes the process based on the configuration information according to the logical printer for the received name of the logical printer, and cause the identified one of the process execution units to perform the process corresponding to the name of the function.

3. The information processing apparatus as claimed in claim 2, wherein when two or more process execution units of the process execution units are associated with the name of the function of the predetermined function interface, the request reception unit is configured to cause the two or more process execution units to perform the process corresponding to the name of the function.

4. The information processing apparatus as claimed in claim 3, wherein
   the storing unit is configured to further store information indicating validity of the process execution units; and
   the request reception unit is configured to
      determine whether the two or more process execution units are valid based on the stored information indicating validity, and
      cause one or more of the two or more process execution units that are determined to be valid to perform the process corresponding to the name of the function.

5. A method performed by an information processing apparatus including a spooler, a request reception unit, a storing unit and at least one process execution unit, the method comprising:
   performing, by the at least one process execution unit, a process corresponding to a name of a function;
   the storing, by storing unit, configuration information that associates the process execution unit with the name of the function;
   receiving, by the request reception unit, a request related to print data from the spooler via a predetermined function interface; and
   identifying, by the request reception unit, the process execution unit for performing the process based on the name of the function of the predetermined function interface for the request and the configuration information, and causing the identified process execution unit, by the request reception unit, to perform the process corresponding to the name of the function.

6. The method as claimed in claim 5, wherein the at least one process execution unit comprises a plurality of process execution units;

the storing unit stores the configuration information for each of a plurality of logical printers; and in the causing step, the request reception unit receives a name of a logical printer from the spooler, identifies one of the process execution units that executes the process based on the configuration information according to the logical printer for the received name of the logical printer, and cause the identified one of the process execution units to perform the process corresponding to the name of the function.

7. The method as claimed in claim 6, wherein when two or more process execution units of the process execution units are associated with the name of the function of the predetermined function interface, the two or more process execution units are caused to perform the process corresponding to the name of the function.

8. The method as claimed in claim 7, further comprising:

determining whether the two or more process execution units are valid based on information stored in the storing unit and indicating validity of the process execution units, wherein in the causing step, one or more of the two or more process execution units that are determined to be valid are caused to perform the process corresponding to the name of the function.

9. A non-transitory computer-readable storage medium storing program code for causing an information processing apparatus including a spooler, a request reception unit, a storing unit and at least one process execution unit to perform a method, the method comprising:

performing, by the at least one process execution unit, a process corresponding to a name of a function;

storing, by the storing unit, configuration information that associates the process execution unit with the name of the function;

receiving, by the request reception unit, a request related to print data from the spooler via a predetermined function interface; and identifying, by the request reception unit, the process execution unit for performing the process based on the name of the function of the predetermined function interface for the request and the configuration information that associates the process execution unit with the name of the function, and causing identified the process execution unit, by the request reception unit, to perform the process corresponding to the name of the function.

* * * * *